(12) United States Patent
Gustafsson et al.

(10) Patent No.: US 11,899,100 B2
(45) Date of Patent: Feb. 13, 2024

(54) METHOD OF DETERMINATION OF ALIGNMENT ANGLES OF RADAR SENSORS FOR A ROAD VEHICLE RADAR AUTO-ALIGNMENT CONTROLLER

(71) Applicant: Zenuity AB, Gothenburg (SE)

(72) Inventors: Tony Gustafsson, Askim (SE); Joakim Sörstedt, Gothenburg (SE)

(73) Assignee: Zenuity AB, Gothenburg (SE)

( * ) Notice: Subject to any disclaimer, the term of this patent is extended or adjusted under 35 U.S.C. 154(b) by 118 days.

(21) Appl. No.: 16/905,379

(22) Filed: Jun. 18, 2020

(65) Prior Publication Data
US 2020/0400814 A1    Dec. 24, 2020

(30) Foreign Application Priority Data
Jun. 18, 2019   (EP) ..................................... 19181007

(51) Int. Cl.
*G01S 13/931*    (2020.01)
*G01S 7/40*    (2006.01)
*G01S 13/72*    (2006.01)

(52) U.S. Cl.
CPC .............. *G01S 13/931* (2013.01); *G01S 7/40* (2013.01); *G01S 13/72* (2013.01); *G01S 2013/93271* (2020.01); *G01S 2013/93272* (2020.01)

(58) Field of Classification Search
CPC ........ G01S 13/931; G01S 13/60; G01S 13/72; G01S 2013/93271; G01S 7/40;
(Continued)

(56) References Cited

U.S. PATENT DOCUMENTS

| | | | |
|---|---|---|---|
| 5,964,822 A * | 10/1999 | Alland | G01S 15/42 |
| | | | 701/96 |
| 6,763,318 B1 * | 7/2004 | Winter | G01S 13/931 |
| | | | 702/158 |

(Continued)

FOREIGN PATENT DOCUMENTS

| | | | | |
|---|---|---|---|---|
| EP | 2068173 A1 * | 6/2009 | ............ | B60W 40/04 |
| EP | 3279683 | 7/2018 | | |

OTHER PUBLICATIONS

Kellner et al., "Joint Radar Alignment and Odometry Calibration", 18th International Conference on Information Fusion, Jul. 6-9, 2015, pp. 366-374.

(Continued)

*Primary Examiner* — Vladimir Magloire
*Assistant Examiner* — Michael W Justice
(74) *Attorney, Agent, or Firm* — DUANE MORRIS LLP; Gregory M. Lefkowitz; Randall C. Pyles (57) ABSTRACT

A method of determination of the alignment angles of two or more road vehicle (1) borne radar sensors (4) for a road vehicle radar auto-alignment controller (3) starting from initially available rough estimates of alignment angles. From at least two radar sensors (4) are obtained signals related to range, azimuth and range rate to detections. The detections are screened (5) to determine detections from stationary targets. From the determined detections from stationary targets is derived a linearized signal processing model involving alignment angles, longitudinal and lateral velocity and yaw-rate of the road vehicle (1). A filter algorithm is applied to estimate the alignment angles. Based on the estimated alignment angles are produced signals suitable for causing a road vehicle (1) radar auto-alignment controller (3) to perform radar offset compensation.

12 Claims, 3 Drawing Sheets

(58) Field of Classification Search
CPC ...... G01S 7/4026; G01S 7/4004; G01S 7/403; G01S 7/4034; G01S 7/4091
USPC .................................................. 342/70, 174
See application file for complete search history.

(56) References Cited

U.S. PATENT DOCUMENTS

| | | | | |
|---|---|---|---|---|
| 7,337,650 | B1* | 3/2008 | Preston | G01P 15/02 |
| | | | | 73/1.38 |
| 7,991,550 | B2* | 8/2011 | Zeng | G01S 13/931 |
| | | | | 701/300 |
| 8,775,064 | B2* | 7/2014 | Zeng | G01S 13/931 |
| | | | | 701/1 |
| 9,618,616 | B2* | 4/2017 | Kishigami | G01S 7/40 |
| 9,776,629 | B2* | 10/2017 | Heinrichs-Bartscher | |
| | | | | B60T 7/22 |
| 10,088,553 | B2* | 10/2018 | Zeng | G01S 13/588 |
| 10,202,125 | B2* | 2/2019 | Kasaiezadeh Mahabadi | |
| | | | | B60W 40/101 |
| 10,634,777 | B2* | 4/2020 | Oh | G05D 1/0257 |
| 10,816,344 | B2* | 10/2020 | Schiffmann | G01C 21/26 |
| 2008/0300787 | A1* | 12/2008 | Zeng | G01S 13/931 |
| | | | | 701/301 |
| 2012/0022739 | A1* | 1/2012 | Zeng | B62D 1/28 |
| | | | | 348/148 |
| 2012/0290169 | A1* | 11/2012 | Zeng | G01S 7/4972 |
| | | | | 701/30.2 |
| 2015/0247924 | A1* | 9/2015 | Kishigami | G01S 7/411 |
| | | | | 342/146 |
| 2015/0276923 | A1 | 10/2015 | Song et al. | |
| 2016/0223661 | A1 | 8/2016 | Song et al. | |
| 2017/0261599 | A1* | 9/2017 | Zeng | G01S 7/4026 |
| 2018/0297605 | A1* | 10/2018 | Kasaiezadeh Mahabadi | |
| | | | | B60W 40/10 |
| 2019/0187250 | A1* | 6/2019 | Ru | G01S 7/4052 |
| 2019/0277639 | A1* | 9/2019 | Schiffmann | G01C 21/26 |
| 2019/0369222 | A1* | 12/2019 | Oh | G05D 1/0257 |
| 2021/0124041 | A1* | 4/2021 | Proefrock | G01S 13/931 |
| 2022/0317288 | A1* | 10/2022 | Goda | G01S 13/931 |

OTHER PUBLICATIONS

Kellner et al., "Instanteous Ego-Motion Estimation using Multiple Doppler Radars", IEEE, 2014, May 31-Jun. 7, 2014, pp. 1592-1597.

* cited by examiner

METHOD OF DETERMINATION OF ALIGNMENT ANGLES OF RADAR SENSORS FOR A ROAD VEHICLE RADAR AUTO-ALIGNMENT CONTROLLER

TECHNICAL FIELD

The present disclosure relates generally to determination of alignment angles of road vehicle radar sensors and in particular a method of determination of the alignment angles of two or more road vehicle borne radar sensors for a road vehicle radar auto-alignment controller starting from initially available rough estimates of alignment angles.

BACKGROUND

Many road vehicles today include object detection sensors, which e.g. are used to enable localization of an ego vehicle as well as to enable collision warning or avoidance and other active safety applications. Such object detection sensors may use any of a number of detection technologies, such as short-range or long-range radar, cameras with image processing, laser or LIDAR, and ultrasound, for example. The object detection sensors detect vehicles and other objects in the vicinity of an ego vehicle, and application software of localization or safety functionalities may use such object detection information to issue warnings or take actions as appropriate.

In order for such localization or safety functionalities to perform optimally, the object detection sensors must be aligned properly with the ego vehicle. Sensor misalignment may have significant consequences as vehicles and other objects in the vicinity of the ego vehicle may be interpreted to have another position than they actually have. Even if there are multiple object detection sensors on a vehicle, it is important that they are aligned, so as to minimize or eliminate conflicting or inaccurate sensor readings.

Previously, object detection sensors have commonly been integrated directly into a front or rear fascia of a road vehicle. This type of installation has the disadvantage that there usually is no practical way to physically adjust the alignment of such object detection sensors. Thus, if an object detection sensor becomes misaligned with the vehicle's true heading, e.g. due to damage to the fascia or age- and weather-related warping, there has traditionally been no way to correct the misalignment, other than to replace the entire fascia assembly containing the sensors.

US 2017261599 (A1) present one attempt at addressing this issue and discloses a method and sensor system for automatically determining object sensor position and alignment on a host vehicle and for automatically calibrating sensor position and alignment in software, thus ensuring accurate sensor readings with no need for mechanical adjustment of the sensors. A radar sensor detects objects surrounding the host vehicle in normal operation. Static objects are identified as those objects with ground speed approximately equal to zero. Vehicle dynamics sensors provide vehicle longitudinal and lateral velocity and yaw-rate data. Measurement data for the static objects—including azimuth angle, range and range rate relative to the sensor—along with the vehicle dynamics data, are used in a recursive geometric calculation which converges on actual values of the radar sensor's two-dimensional position and azimuth alignment angle on the host vehicle. Only static objects are used in the pose estimation calculations. By using only static objects, the number of unknowns involved in the sensor pose estimation calculations is reduced such that the pose of the radar sensor can be determined through recursive computations over a number of measurement cycles. The static object has a position defined by a range and an azimuth angle and a range rate, all of which are measured by the radar sensor. From defined geometric relationships, a pair of calculations can be performed recursively upon arrival of each new set of sensor measurement data. In the first calculation, the azimuth orientation angle $\alpha$ is assumed to be known (from a default setting, or from a previous cycle of the recursive calculation), and the position values a and b are calculated. In the second calculation, the position values a and b are assumed to be known (from a default setting, or from a previous cycle of the recursive calculation), and the azimuth orientation angle $\alpha$ is calculated. Over a period of time (nominally one minute to a few minutes), with measurement data arriving several times per second, these calculations converge to yield the actual values of the sensor pose $(a,b,\alpha)$.

Although US 2017261599 (A1) discuss estimation of azimuth alignment angles and sensor mounting position, this is done assuming the longitudinal velocity, the lateral velocity, and the yaw-rate to be known, which enables a solution through solving a minimization problem as a constrained least squares problem. However, in many cases longitudinal velocity, lateral velocity and yaw-rate are not known, why this solution cannot be applied. Thus, there is a need for improving determination of the alignment angles of road vehicle borne object sensors, and in particular road vehicle borne radar sensors.

SUMMARY

An object of the present invention is to provide an improved method of determination of the alignment angles of two or more road vehicle borne radar sensors.

According to a first aspect there is provided method of determination of the alignment angles of two or more road vehicle borne radar sensors for a road vehicle radar auto-alignment controller starting from initially available rough estimates of alignment angles, the method comprising: obtaining, from at least two radar sensors, signals related to range, azimuth and range rate to detections; screening the detections to determine detections from stationary targets; deriving, from the determined detections from stationary targets, a linearized signal processing model involving alignment angles, longitudinal and lateral velocity and yaw-rate of the road vehicle; applying a filter algorithm to estimate the alignment angles; producing, based on the estimated alignment angles, signals suitable for causing a road vehicle radar auto-alignment controller to perform radar offset compensation. Through allowing the use of a linearized signal processing model is enabled application of computationally efficient filter algorithms to estimate the alignment angles in an effective and swift manner.

In a further embodiment the method further comprises obtaining the initially available rough estimates of alignment angles from known nominal mounting angles of the vehicle borne radar sensors.

In a yet further embodiment, the method further comprises screening the detections to determine detections from stationary targets through monitoring longitudinal and lateral velocity and yaw-rate of the road vehicle together with the obtained range-rates of the detections.

In a still further embodiment the method further comprises screening the detections to determine detections from stationary targets using so-called Random Sample Consensus (RANSAC) techniques or by running target tracking and looking at temporal effects.

In an additional embodiment the method further comprises deriving the linearized signal processing model by performing a Taylor series expansion of a rotation matrix involving azimuth alignment angles, longitudinal and lateral velocity and yaw-rate of the road vehicle.

In yet an additional embodiment the method further comprises that the filter algorithm applied to estimate the alignment angles is one of a Kalman filter, a Least mean squares filter, a Recursive least squares filter, a Windowed least squares filter or a filter algorithm based on other signal processing algorithms suitable for utilizing with the linearized signal processing model.

According to a second aspect there is provided a road vehicle system comprising a controller for radar auto-alignment in accordance with the above method.

According to a further aspect there is provided a road vehicle road vehicle comprising a system having a controller for radar auto-alignment in accordance with the above method.

According to a still further aspect there is provided a computer program embodied on a non-transitory computer-readable storage medium, the computer program comprising program code for controlling a road vehicle radar auto-alignment controller to execute a process for road vehicle radar auto-alignment, the process comprising the above method.

According to a yet further aspect there is provided a computer program comprising instructions that when executed by a processing circuit is configured to cause the road vehicle system to perform the above method.

According to an additional embodiment there is provided a carrier comprising the above computer program, wherein the carrier is one of an electronic signal, optical signal, radio signal or computer readable storage medium.

The above embodiments have the beneficial effects of allowing the use of a linearized signal processing model and thus enabling application of computationally efficient filter algorithms to estimate the alignment angles in an effective and swift manner also on-board a road vehicle.

Additional features of the present invention will become apparent from the following description and appended claims, taken in conjunction with the accompanying drawings.

BRIEF DESCRIPTION OF DRAWINGS

In the following, embodiments herein will be described in greater detail by way of example only with reference to attached drawings, in which.

DESCRIPTION OF EMBODIMENTS

In the following will be described some example embodiments of a method of determination of the alignment angles of two or more road vehicle 1 borne radar sensors 4 for a road vehicle radar auto-alignment controller 3, a road vehicle system 2 comprising a controller 3 for radar auto-alignment in accordance with the method and a road vehicle 1 comprising such a system 2 as well as a computer program 12 for causing such a system 2 to perform the method.

Radar auto-alignment is the problem of unsupervised precise determination of an angle between a principal beam direction of a radar sensor 4 and a direction of an associated road vehicle 1. This angle varies due to mounting tolerances in the factory, but there will usually also be some drifts while the radar sensor 4 is in operation, due to wear and temperature changes, that has to be compensated for continuously.

The problem considered here is thus on-line estimation of radar 4 alignment angles in a computationally efficient manner. The method presented herein also enables estimation of longitudinal- and lateral-velocity as well as yaw-rate.

The proposed method is mainly useful for offset compensation of angles reported by the radar 4 but also for calibration of vehicle dynamics ego motion data, primarily longitudinal velocity, and for monitoring of the radar 4, e.g. from a safety perspective.

Thus, described herein is a method of determination of the alignment angles of two or more road vehicle 1 borne radar sensors 4 for a road vehicle radar auto-alignment controller 3 starting from initially available rough estimates of alignment angles.

The initially available rough estimates of alignment angles may e.g. be obtained from known nominal mounting angles of the vehicle borne radar sensors 4. These known nominal mounting angles of the vehicle borne radar sensors 4 may e.g. be obtained from a road vehicle 1 related database comprising nominal parameters for the radar sensors 4, such as data on the mounting alignment angles of the radar sensors 4.

From at least two radar sensors 4 are obtained signals related to range, azimuth and range rate to detections. This, as the proposed system of equations is underdetermined for one radar 4. In accordance with the proposed method, signals from at least two radars 4 are required for single snapshot estimation of alignment angles and the road vehicle 1 velocity.

The detections are screened 5 to determine detections from stationary targets. Screening the detections to determine detections from stationary targets may e.g. be done through monitoring longitudinal and lateral velocity and yaw-rate of the road vehicle 1 together with the obtained range-rates of the detections. Thus, determination may e.g. be done by the radars 4 measuring the difference in velocity of detections projected in an azimuth direction and combining this with an ego-vehicle 1 velocity, to deduce if a detection comes from a stationary target or not.

Alternatively, screening 5 the detections to determine detections from stationary targets may be performed using so-called Random Sample Consensus (RANSAC) techniques or by running target tracking and looking at temporal effects.

RANSAC is an iterative method to estimate parameters of a mathematical model from a set of observed data that contains outliers, when outliers are to be accorded no influence on the values of the estimates. Therefore, it also can be interpreted as an outlier detection method. It is a non-deterministic algorithm in the sense that it produces a reasonable result only with a certain probability, with this probability increasing as more iterations are allowed. A basic assumption is that the data consists of "inliers", i.e., data whose distribution can be explained by some set of model parameters, though may be subject to noise, and "outliers" which are data that do not fit the model. The outliers can come, for example, from extreme values of the noise or from erroneous measurements or incorrect hypotheses about the interpretation of data. RANSAC also assumes that, given a (usually small) set of inliers, there exists a procedure which can estimate the parameters of a model that optimally explains or fits this data.

From the determined detections from stationary targets is derived a linearized signal processing model involving alignment angles, longitudinal and lateral velocity and yaw-rate of the road vehicle. The linearized signal processing model may be derived by performing a Taylor series expansion of a rotation matrix involving alignment angles, longitudinal and lateral velocity and yaw-rate of the road vehicle, as described in the following.

Figure 1:
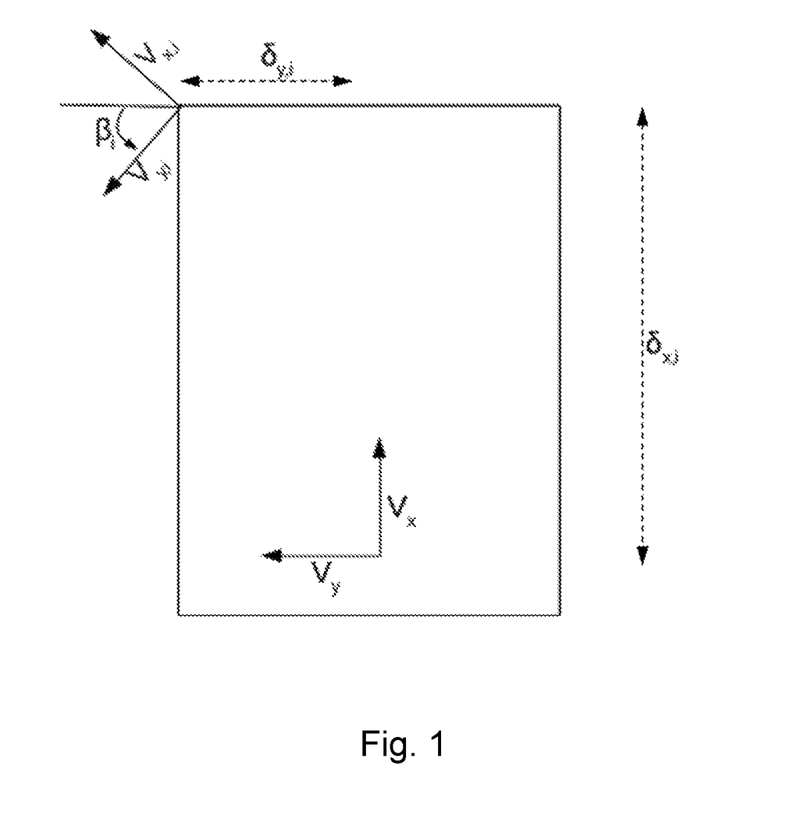
FIG. 1 illustrates schematically the positioning and alignment of one radar sensor at an ego-vehicle.

To derive the signal processing model for the work presented here, consider first FIG. 1, schematically illustrating the positioning and alignment of one radar sensor 4 at an ego-vehicle 1.

Here $v_x$ and $v_y$ are the ego-vehicle 1 longitudinal and lateral velocity at the center of the rear axle of the ego-vehicle 1. The longitudinal distance from the center of the rear axle of the ego-vehicle 1 to the location of the i:th radar is denoted $\delta_{x,i}$ whereas the lateral distance is denoted $\delta_{y,i}$. The alignment angle is denoted $\beta_i$, and the ego-vehicle velocities expressed in the radar coordinate frame are denoted $v_{x,i}$ and $v_{y,i}$ respectively. The ego-vehicle velocities in the radar coordinate frame, assuming plane motion, are obtained from.

$$\begin{bmatrix} v_{x,i} \\ v_{y,i} \end{bmatrix} = \begin{bmatrix} \cos \beta_i & \sin \beta_i \\ -\sin \beta_i & \cos \beta_i \end{bmatrix} \left( \begin{bmatrix} v_x \\ v_y \end{bmatrix} + \Omega_z \begin{bmatrix} -\delta_{y,i} \\ \delta_{x,i} \end{bmatrix} \right)$$

In the above expression, $\Omega_z$ denotes the vehicle yaw-rate. From the publication "Instantaneous Ego-motion Estimation using Multiple Doppler Radars", Kellner et al, 2014 IEEE International conference on robotics and automation, pp 1592-1597., we have the following model, assuming there are $M_i$ detections from stationary targets for the i:th radar:

$$\begin{bmatrix} -v_{1,i}^D \\ \vdots \\ -v_{M_i,i}^D \end{bmatrix} = \begin{bmatrix} \cos(\theta_{1,i} + \beta_i) & \sin(\theta_{1,i} + \beta_i) \\ \vdots & \vdots \\ \cos(\theta_{M_i,i} + \beta_i) & \sin(\theta_{M_i,i} + \beta_i) \end{bmatrix} \left( \begin{bmatrix} v_x \\ v_y \end{bmatrix} + \Omega_z \begin{bmatrix} -\delta_{y,i} \\ \delta_{x,i} \end{bmatrix} \right)$$

Here $v_{j,i}^D$ is the doppler velocity, also called "range rate", for the j:th detection, and $\theta_{j,i}$ the azimuth for the j:th detection in sensor frame.

In order to perform estimation, to begin with, we aim at compressing the amount of data by computing the following velocities:

$$\begin{bmatrix} \hat{v}_x \\ \hat{v}_y \end{bmatrix} = \begin{bmatrix} \cos(\theta_{1,i}) & \sin(\theta_{1,i}) \\ \vdots & \vdots \\ \cos(\theta_{M_i,i}) & \sin(\theta_{M_i,i}) \end{bmatrix}^\dagger \begin{bmatrix} -v_{1,i}^D \\ \vdots \\ -v_{M_i,i}^D \end{bmatrix}$$

The above computation relies on a Moore Penrose pseudo-inverse of the matrix to compute the estimation.

Note that this estimate depends on having the ability to successfully screen data for stationary detections, the data of which are retained as anchors. Typically, this screening process is based on monitoring the vehicle dynamics ego-vehicle velocity together with the radar range-rates. However, this screening process may potentially sometimes be hard to make robust, and optionally one may therefore wish to consider so-called RANSAC techniques for deciding which detections originates from stationary objects.

To continue, after some rearranging, the model now reads as follows:

$$\begin{bmatrix} \cos \beta_i & -\sin \beta_i \\ \sin \beta_i & \cos \beta_i \end{bmatrix} \begin{bmatrix} \hat{v}_{x,i} \\ \hat{v}_{y,i} \end{bmatrix} = \left( \begin{bmatrix} v_x \\ v_y \end{bmatrix} + \Omega_z \begin{bmatrix} -\delta_{y,i} \\ \delta_{x,i} \end{bmatrix} \right)$$

To arrive at the proposed signal processing model, we linearize w.r.t. $\beta_i$ assuming, as elaborated above, that we have rough estimates of alignment angles initially available: $\beta_i = \beta_i^{nom} + \xi_i$. In practice this is a reasonable assumption since the nominal mounting angles are known, and we are interested in estimating the small residual alignment angles, e.g. on the order of 1 degree. The linearized model, now looks like:

$$\begin{bmatrix} \hat{v}_x \cos \beta^{nom} - \hat{v}_y \sin \beta^{nom} + \Omega_z \delta_y \\ \hat{v}_x \sin \beta^{nom} + \hat{v}_y \cos \beta^{nom} - \Omega_z \delta_x \end{bmatrix} =$$

$$\begin{bmatrix} (-\hat{v}_x \sin \beta^{nom} - \hat{v}_y \cos \beta^{nom}) & 1 & 0 \\ (\hat{v}_x \cos \beta^{nom} - \hat{v}_y \sin \beta^{nom}) & 0 & 1 \end{bmatrix} \begin{bmatrix} \xi \\ v_x \\ v_y \end{bmatrix}$$

For notational simplicity the equations only for one radar is written out above.

A filter algorithm can now be applied to this linearized model in order to to estimate the alignment angles. The filter algorithm applied to estimate the alignment angles is suitably one of a Kalman filter, a Least mean squares filter, a Recursive least squares filter, and a Windowed least squares filter or a filter algorithm based on other signal processing algorithms suitable for utilizing with the linearized signal processing model.

Kalman filtering, also known as linear quadratic estimation (LQE), is an algorithm that uses a series of measurements observed over time, containing statistical noise and other inaccuracies, and produces estimates of unknown variables that tend to be more accurate than those based on a single measurement alone, by estimating a joint probability distribution over the variables for each timeframe.

The algorithm works in a two-step process. In the prediction step, the Kalman filter produces estimates of the current state variables, along with their uncertainties. Once the outcome of the next measurement is observed, these estimates are updated using a weighted average, with more weight being given to estimates with higher certainty. The algorithm is recursive. It can run in real time, using only the present input measurements and the previously calculated state and its uncertainty matrix; no additional past information is required.

Least mean squares (LMS) algorithms are a class of adaptive filter used to mimic a desired filter by finding the filter coefficients that relate to producing the least mean square of the error signal, i.e. the difference between the desired and the actual signal. It is a stochastic gradient descent method in that the filter is only adapted based on the error at the current time.

Recursive least squares (RLS) is an adaptive filter algorithm that recursively finds the coefficients that minimize a weighted linear least squares cost function relating to the input signals. RLS exhibits extremely fast convergence. However, this benefit comes at the cost of high computational complexity, which, as described earlier, might be undesirable due to potential limitations in road vehicle on-board processing power.

Windowed Least Squares (WLS) is a recursive variant of the Least Squares method which aims at minimizing the squared error but this over a finite window instead of only one iteration.

In a preferred embodiment the linearized model is plugged into a linear Kalman filtering machinery. Note that the above system of equations is underdetermined for one radar 4. At least two radars 4 are required for single snapshot estimation of alignment angles and the road vehicle 1 velocity.

An advantage of using a Kalman filter is that alignment angles can be estimated for several radar sensors 4 at the same time, as compared to prior-art solutions, such as US 2017261599 (A1), which performs estimation for one radar at a time. Thus, the Kalman filter both performs averaging over time, in order to reduce noise and obtain stable angles, and combines data from e.g. four radars 4a, 4b, 4c, and 4d at the same time, making it faster and more efficient than the other alternatives.

To arrive at the above linearized signal processing the amount of data should be compressed, as described above, otherwise one would have to deal with a non-linear model, which would be difficult if not impossible to process in real-time in a road vehicle 1 due to potential limitations in processing power. The herein proposed linearized signal processing model allows for simple real-time processing in a road vehicle 1, thus making it highly useful.

Based on the estimated alignment angles are produced signals suitable for causing a road vehicle 1 radar auto-alignment controller 3 to perform radar 4 offset compensation. Such signals may, for each radar sensor 4, e.g. correspond to the difference between an assumed initial alignment angle and an actual estimated alignment angle.

Figure 2:
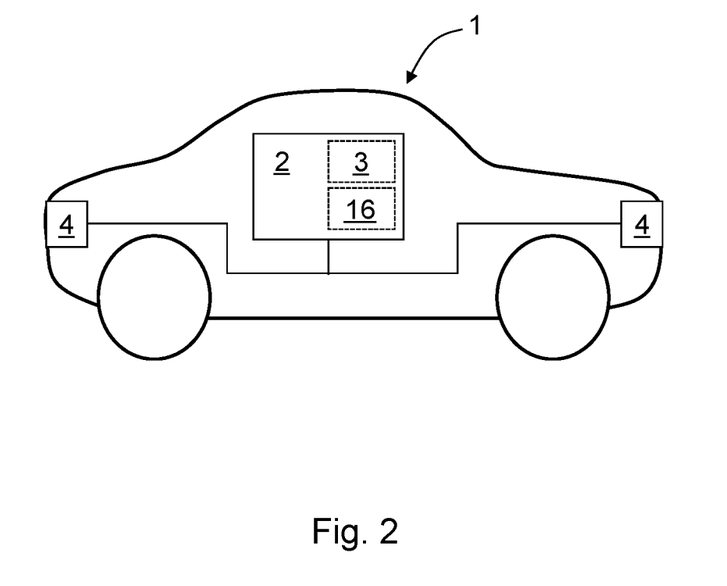
FIG. 2 illustrates schematically a road vehicle having a system comprising a controller for radar auto-alignment in accordance with the herein described method.

As illustrated in FIG. 2, it is further envisaged a road vehicle 1 system 2 comprising a controller 3 for radar 4 auto-alignment in accordance with the herein described method and a road vehicle 1 comprising such a system 2 having such a controller 3 for radar 4 auto-alignment.

The system 2 may be an Advanced Driver Assistance System (ADAS), such as e.g. a system for assisting in vehicle localization, for providing collision warning or avoidance or similar.

Figure 3:
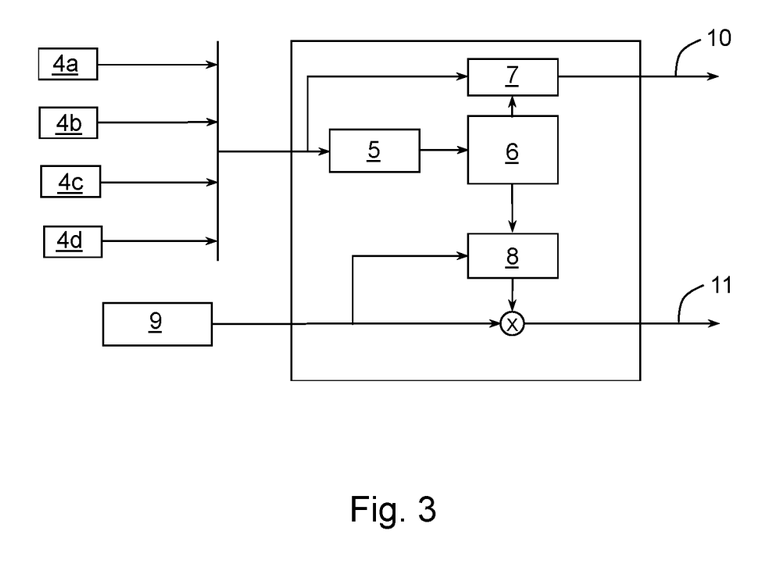
FIG. 3 illustrates schematically a feasible functional architecture for enabling radar auto-alignment in accordance with the herein described method.

FIG. 3 illustrates schematically a feasible functional architecture for enabling radar auto-alignment in accordance with the herein described method. Radar sensors, front-left 4a, front-right 4b, rear-left 4c and rear-right 4d, are arranged to provide range, azimuth and range rate to detected objects. Screening 5 is performed to find detections from stationary objects. The linearized processing model is subjected to a Kalman filter 6, which provide the alignment angle offsets for the four radars 4a, 4b, 4c and 4d. Radar offset compensation 7 is performed using the alignment angle offsets for the four radars 4a, 4b, 4c and 4d obtained from the Kalman filter 6 for producing alignment compensated signals 10.

Furthermore, as the Kalman filter 6 also can provide the longitudinal velocity, lateral velocity and yaw-rate of the ego-vehicle 1, it is e.g. possible to use the longitudinal velocity provided by the Kalman filter 6 to estimate a scale error 8 on a longitudinal velocity provided from vehicle dynamics 9 to provide an improved longitudinal velocity signal 11.

Furthermore, here envisaged is a computer program 12, e.g. embodied on a non-transitory computer-readable storage medium, the computer program 12 comprising program code for controlling a road vehicle 1 radar auto-alignment controller 3 to execute a process for road vehicle 1 radar auto-alignment, the process comprising the herein described method.

Figure 4:
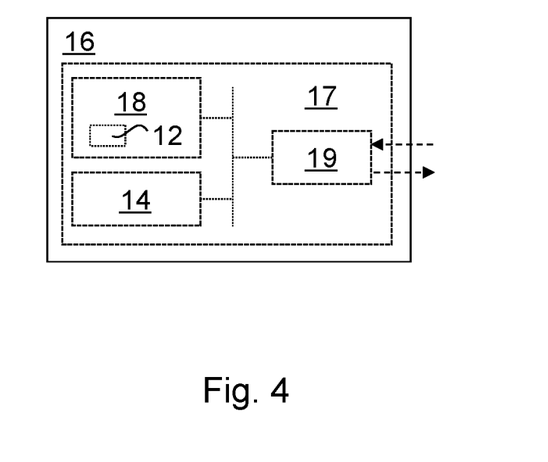
FIG. 4 illustrates schematically a data processing arrangement for carrying out the various steps and processes described herein.

As illustrated in FIG. 4, the system 2 may comprise one or more data processing arrangements 16, each including a processing module 17 generally including at least one processing circuit 14 comprising one or more processors and including at least one memory 18, the memory storing instructions, e.g. the computer program 12 (software), executable by the processing circuit 14, including instructions for carrying out the various steps and processes described herein. It usually also comprises an I/O module 19, providing for input of data to be processed and output of the results of such processing.

A such computer program 12 can comprise instructions that when executed by a processing circuit 14, is configured to cause the road vehicle system 2 to perform the method. The processing circuit 14 may comprise a set of one or more processors (not shown). A carrier (not shown) may comprise the computer program 4, where the carrier may be one of an electronic signal, optical signal, radio signal or computer readable storage medium.

Figure 5:
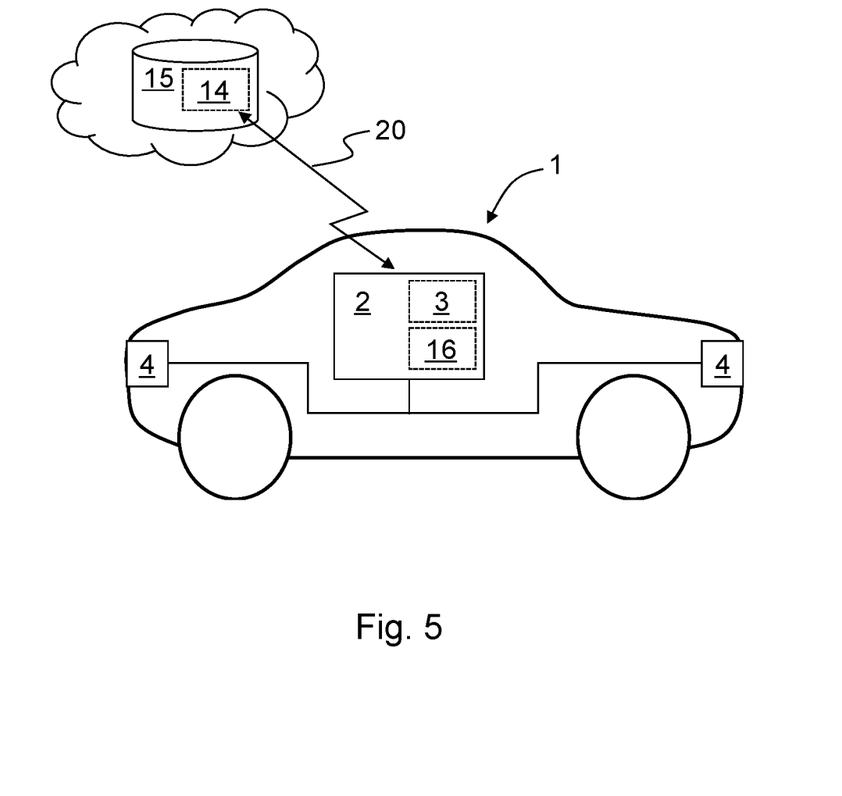
FIG. 5 illustrates schematically how processing, according to alternative embodiments, may be performed at a location remote from the road vehicle.

The processing circuit 14 may be arranged in the road vehicle 1 system 2, as illustrated in FIG. 2, or at a location remote from the road vehicle 1, e.g. a remote server 15, as illustrated in FIG. 5.

In embodiments where the processing circuit 14 is arranged at a remote server 15 the method may e.g. be implemented through continuously streaming data between the processing circuit 14 and the road vehicle 1. Streaming is the delivery of content in real-time, as events happen, i.e. transferring a continuous stream of data.

The system 2 or the remote server 15 may comprise the one or more data processing arrangements 16, as illustrated in FIG. 4, each including the processing module 17 generally including the at least one processing circuit 14 comprising the one or more processors and including the at least one memory 18, storing instructions, e.g. the computer program 12 (software), executable by the processor, including instructions for carrying out the various steps and processes described herein, and also comprise the I/O module 19, providing for the input of data to be processed and the output of the results of such processing.

Streaming of data between the road vehicle 1 and the processing circuit 14 located at such a remote server 15 (cloud) and back to a road vehicle system 2 comprising the controller 3 for radar auto-alignment of the road vehicle 1 may further include a communication network, e.g. as illustrated by arrow 20, connected to the remote server 15. Such a communication network 20 represents one or more mechanisms by which a road vehicle 1 may communicate with the remote server 15. Accordingly, the communication network 20 may be one or more of various wireless communication mechanisms, including any desired combination of wireless, e.g., radio frequency, cellular, satellite, and microwave communication mechanisms and any desired network topology. Exemplary communication networks include wireless communication networks, e.g., using Bluetooth, IEEE 802.11, LTE, 5G, etc.

Combination of all above mentioned factors contribute to the improved method of determination of the alignment angles of two or more road vehicle borne radar sensors in a computationally efficient manner suitable for on-board use in a road vehicle radar auto-alignment controller.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims.

Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims.

In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

The invention claimed is:

1. A method of determining alignment angles of at least two or more road vehicle borne radar sensors for producing signals suitable to cause a road vehicle radar auto-alignment controller to perform radar offset compensation starting from initially available rough estimates of the alignment angles, the method comprising:
   obtaining, from the at least two or more road vehicle borne radar sensors, signals related to range, azimuth, and range rate to detections;
   screening the obtained signals from the at least two or more road vehicle borne radar sensors to determine detections from stationary targets;
   deriving, from the determined detections from stationary targets based on the obtained signals from the at least two or more road vehicles borne radar sensors, a linearized signal processing model involving the alignment angles, longitudinal and lateral velocity, and yaw-rate of the road vehicle, the linearized signal processing model linearized with respect to alignment angles having the initially available rough estimates of the alignment angles;
   applying a Kalman filter algorithm to the linearized signal processing model to estimate the alignment angles for the at least two or more road vehicle borne radar sensors by combining the obtained signals from all of the at least two or more road vehicle borne radar sensors;
   producing, based on the estimated alignment angles, the signals suitable to cause the road vehicle radar auto-alignment controller to perform the radar offset compensation.

2. The method according to claim 1, further comprising obtaining the initially available rough estimates of the alignment angles from known nominal mounting angles of the at least two or more road vehicle borne radar sensors.

3. The method according to claim 1, wherein the screening the detections to determine detections from stationary targets is done through monitoring longitudinal and lateral velocity and yaw-rate of the road vehicle together with the obtained range-rates of the detections.

4. The method according to claim 1, wherein the screening the detections to determine detections from stationary targets is done using Random Sample Consensus (RANSAC) techniques or by running target tracking and looking at temporal effects.

5. The method according to claim 1, wherein the deriving the linearized signal processing model is done by performing a Taylor series expansion of a rotation matrix involving the alignment angles.

6. A road vehicle system comprising a road vehicle radar auto-alignment controller that performs the radar offset compensation based on the signals produced in accordance with the method of claim 1.

7. A road vehicle comprising a road vehicle system comprising a road vehicle radar auto-alignment controller that performs the radar offset compensation based on the signals produced in accordance with the method of claim 1.

8. A computer program embodied on a non-transitory computer-readable storage medium, the computer program comprising program code for controlling a road vehicle radar auto-alignment controller to execute a process for road vehicle radar auto-alignment, the process comprising the method of claim 1.

9. A computer program embodied on a non-transitory computer-readable storage medium, the computer program comprising instructions that when executed by a processing circuit is configured to cause the road vehicle system to perform the method according to claim 1.

10. A method of determining alignment angles of at least two or more road vehicle borne radar sensors for producing signals suitable to cause a road vehicle radar auto-alignment controller to perform radar offset compensation starting from initially available rough estimates of the alignment angles, the method comprising:
    obtaining, from the at least two or more road vehicle borne radar sensors, signals related to range, azimuth, and range rate to detections;
    screening the obtained signals from the at least two or more road vehicle borne radar sensors to determine detections from stationary targets;
    deriving, from the determined detections from stationary targets based on the obtained signals from the at least two or more road vehicles borne radar sensors, a linearized signal processing model involving the alignment angles, longitudinal and lateral velocity, and yaw-rate of the road vehicle, the linearized signal processing model linearized with respect to alignment angles having the initially available rough estimates of the alignment angles;
    estimating the alignment angles for the at least two or more road vehicle borne radar sensors by applying a Kalman filter algorithm to the linearized signal processing model by combining the obtained signals from all of the at least two or more road vehicle borne radar sensors; and performing the radar offset compensation, based on the estimated alignment angles, by the road vehicle radar auto-alignment controller.

11. The method of claim 10, wherein the radar offset compensation is a difference between the initially available rough estimates of the alignment angles and the estimated alignment angles.

12. A method of performing radar offset compensation of at least two or more road vehicle borne radar sensors, the method comprising:

obtaining, from the at least two or more road vehicle borne radar sensors, signals related to range, azimuth, and range rate to detections;

screening the obtained signals from the at least two or more road vehicle borne radar sensors to determine detections from stationary targets;

deriving, from the determined detections from stationary targets based on the obtained signals from the at least two or more road vehicles borne radar sensors, a linearized signal processing model involving alignment angles, longitudinal and lateral velocity, and yaw-rate of the road vehicle, the linearized signal processing model linearized with respect to initially available rough estimates of the alignment angles;

estimating the alignment angles for the at least two or more road vehicle borne radar sensors by applying a Kalman filter algorithm to the linearized signal processing model by combining the obtained signals from all of the at least two or more road vehicle borne radar sensors; and causing a road vehicle radar auto-alignment controller to perform the radar offset compensation of two or more road vehicle borne radar sensors based on the estimated alignment angles.

* * * * *